Jan. 14, 1964     C W. MUSSER     3,117,763
HELICAL HARMONIC DRIVE FOR A ROTARY PLUG VALVE
Filed March 22, 1961     5 Sheets—Sheet 1

Inventor
C Walton Musser
By his Attorneys

Jan. 14, 1964  C W. MUSSER  3,117,763
HELICAL HARMONIC DRIVE FOR A ROTARY PLUG VALVE
Filed March 22, 1961  5 Sheets-Sheet 3

Jan. 14, 1964          C W. MUSSER          3,117,763
HELICAL HARMONIC DRIVE FOR A ROTARY PLUG VALVE
Filed March 22, 1961                       5 Sheets-Sheet 4

Jan. 14, 1964 C W. MUSSER 3,117,763
HELICAL HARMONIC DRIVE FOR A ROTARY PLUG VALVE
Filed March 22, 1961

3,117,763
HELICAL HARMONIC DRIVE FOR A ROTARY
PLUG VALVE
C Walton Musser, Beverly, Mass., assignor to United
Shoe Machinery Corporation, Boston, Mass., a corporation of New Jersey
Filed Mar. 22, 1961, Ser. No. 97,612
6 Claims. (Cl. 251—165)

The present invention relates to helical harmonic drives.

A purpose of the invention is to provide a harmonic drive which will selectively and according to the direction in which drag is applied on one of the drive elements, produce motion axially or rotationally.

A further purpose is to provide a harmonic drive which will sequentially cause axial and rotational motion, for example, first causing motion axially in one direction, and then causing rotational motion and then by reversal causing axial motion in the opposite direction.

A further purpose is to facilitate locking and unlocking of members which must also move at right angles to the direction of locking and unlocking, and to accomplish both operations by the same drive.

A further purpose is to permit hermetically sealing a drive and actuating a drive for selective rotational or longitudinal motion through a hermetic sealing wall.

A further purpose is to manipulate an element such as the plug of a plug valve both axially and rotationally by a single harmonic drive.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

Figure 2:
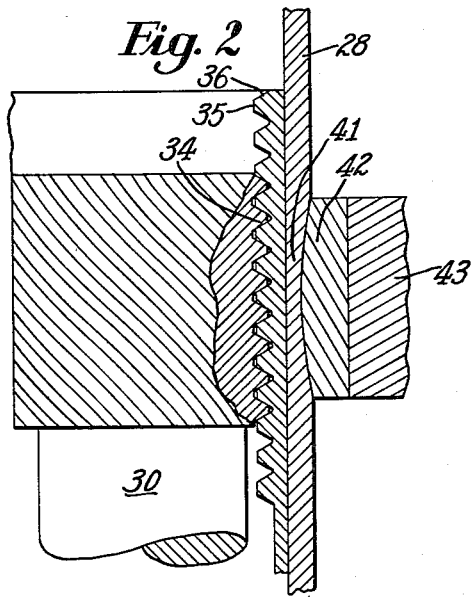
FIGURE 2 is a fragmentary diagrammatic axial section of the helical drive of FIGURE 1, illustrating the relation of the teeth on the plug, the nut, the sealing closure and the wave generator at the position of engagement on the minor axis of the elliptoid.
Figure 3:
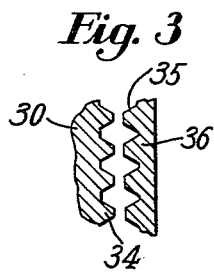
FIGURE 3 is a fragmentary view corresponding to FIGURE 2, showing the position in which the teeth are out of engagement and out of mesh at the major axis of the elliptoid.
Figure 5:
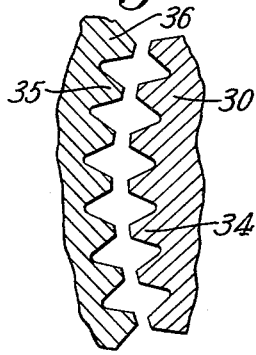
FIGURE 5 is a fragmentary enlargement of a portion of FIGURE 4, showing the relationship of the teeth at the major axis of the elliptoid.
Figure 6:
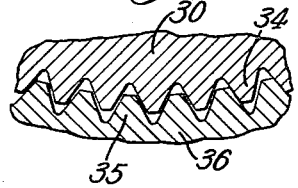
FIGURE 6 is a fragmentary enlargement of a portion of FIGURE 4 showing the relationship of the teeth at the minor axis of the elliptoid.

FIGURES 5 and 6 differ from FIGURES 2 and 3 in that FIGURES 2 and 3 are axial sections and FIGURES 5 and 6 are transverse sections. It will thus be evident that the teeth are doing the same thing at corresponding positions in two different transverse directions to one another.

Figure 7:
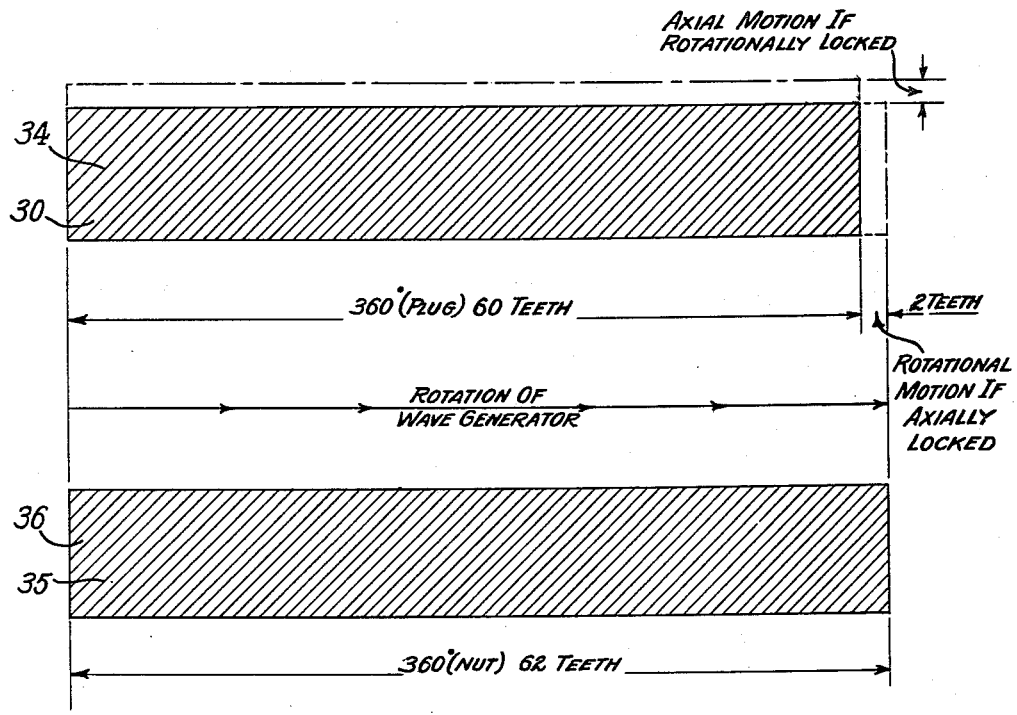

FIGURE 7 is a diagrammatic fragmentary developed view of the teeth on both the plug and the nut of FIGURES 1 to 6. The teeth are laid out so that the 360° from left to right represents the number of teeth and the helix angle of the teeth for both the nut and the plug. It can here be seen that the plug has 60 teeth so that as a consequence its circumference is shorter than that of the nut, which in the particular example has 62 teeth. The illustration indicates how motion is produced.

Figure 8:
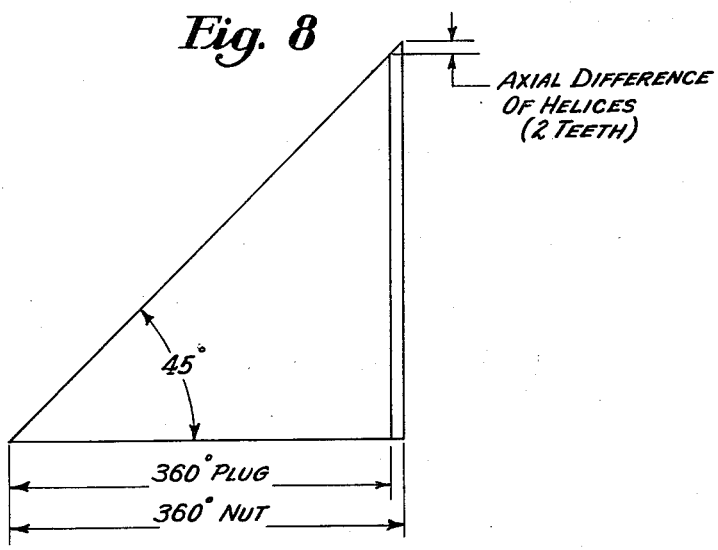

FIGURE 8 is a diagram useful in explaining the invention. It illustrates a 45° helix angle on both the plug and the nut with the circumferences of both the plug and the nut laid out along the bottom. The difference in the number of teeth is 2, so that the difference in the circumferences of the two helix lines produces an axial difference of one in relation to the other.

Figure 9:
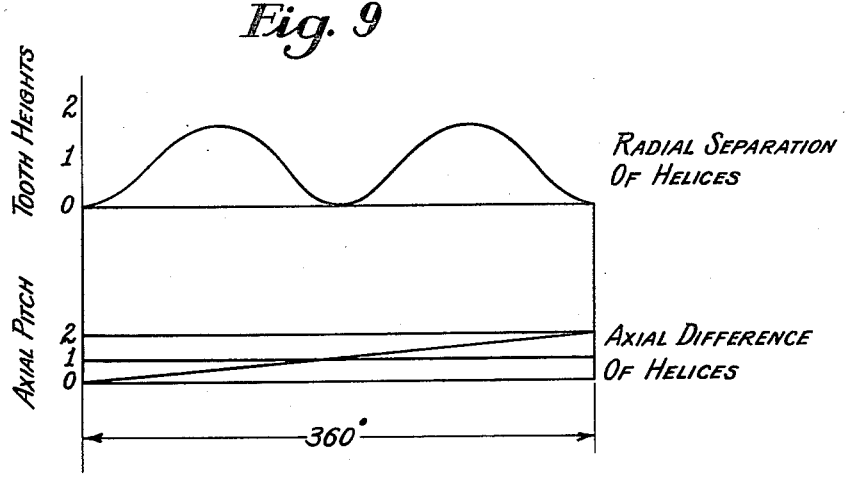

FIGURE 9 is a graph of the radial separation of the helices calibrated in tooth heights over the 360°, indicating that along the sine wave created by the wave generator the separation of the two pitch lines is approximately 1½ tooth heights. In a lower graph on the same figure it shows the axial difference of the helices and this is measured in axial pitch. It will be evident that the axial difference between the two helices in 360° is equal to two pitch or two teeth.

Figure 10:
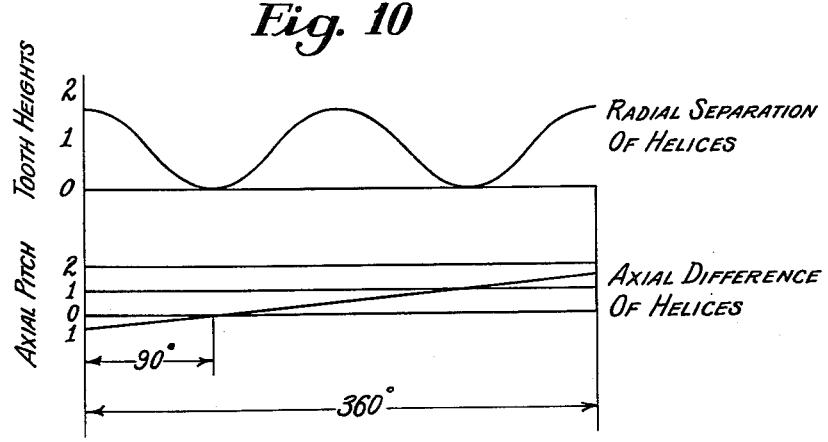

FIGURE 10 is a graph similar to FIGURE 9 except that the wave has moved to the right a distance of 90°. This is intended to illustrate that the place where the axial clearance is 0, the axial difference of the helix must be either 0, 1, 2 or some other even number and not a fraction. As the wave progresses to the right, the point of crossing of the graph line with the 0 line moves to the right.

Figure 11:
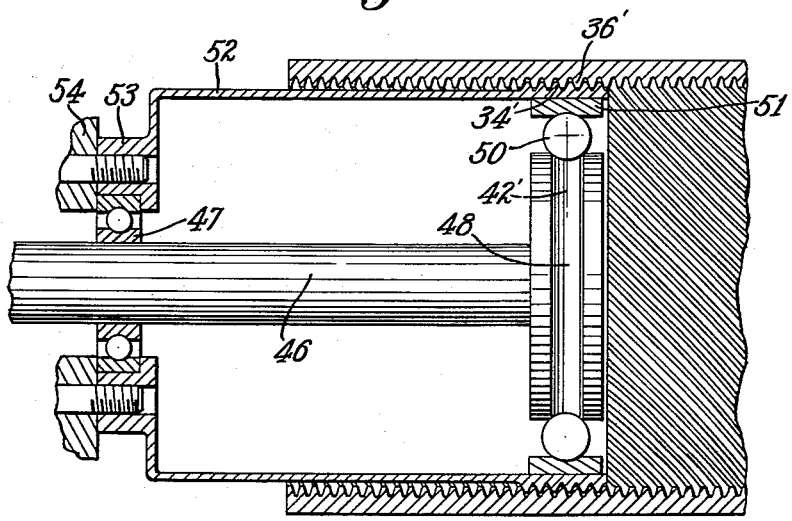

FIGURE 11 is an axial section of a variant embodiment of the invention which has an internal wave generator, and the helical teeth are on the inside of the outer drive element and on the outside of the inner drive element.

Figure 12:
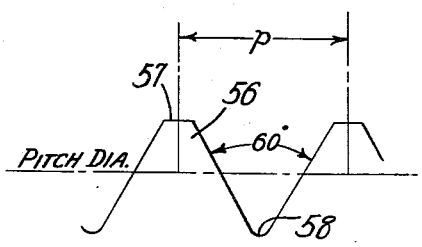

FIGURE 12 is a longitudinal section showing a typical tooth form for the teeth on the drive of the invention taken in a transverse direction to the axis.

Figure 13:
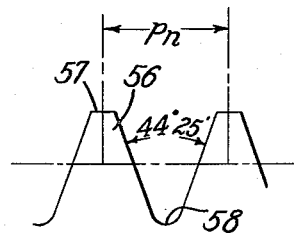

FIGURE 13 is a section of the tooth form normal to the tooth. For a 60° included tooth angle on the cross sectional axis, the included tooth angle looked at along the tooth or along the helix angle is 44° and 25 minutes, and the pitch is shortened so that the distance between the teeth will be 0.707×the distance between the teeth on the cross sectional view.

In the present invention, a harmonic drive is employed which uses helical teeth or threads, depending on which language is used, and can operate either to produce linear motion if it is rotationally locked or rotational motion if it is linearly or axially locked.

The choice of the language, as to whether the projections are referred to as teeth or threads, depends upon whether one is thinking of the device from the standpoint of a device which produces rotation or a device which produces linear motion. In the aspect of producing rotation, the projections are more logically teeth, but in the production of linear motion the projections are more logically threads, and either language may be used depending on which aspect one thinks of.

Figure 1:
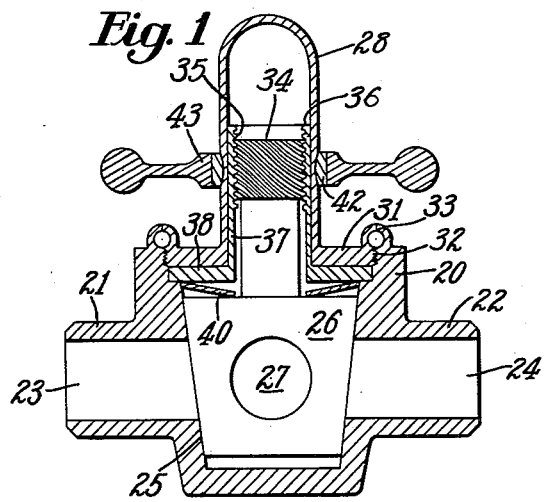
FIGURE 1 is a diagrammatic central longitudinal section of a helical harmonic drive according to the invention applied to a plug valve by way of illustration.

In order to demonstrate the principles of the invention, a plug valve is shown in FIGURE 1, but it will be understood that this is merely by way of example and not intended by any means to restrict the application of the invention to plug valves.

FIGURE 1 illustrates a housing having end connections 21 and 22 each of which is provided with a passage 23 or 24. Tapered valve seat 25 is provided at the middle of the housing as well known in the art which receives a valve plug 26 which is tapered to fit the seat and which has a bore 27 which in the open position connects between the passages 23 and 24 and in the closed position cuts off such flow.

The housing is closed by a deflectable closure 28 which has a tubular portion extending up around shank 30 of the plug and has a flange portion 31 which extends out into engagement with the housing, is threaded into the housing at 32 and is seal-welded to the housing at 33.

The choice of materials for the housing, the plug and the cover will preferably be corrosion resisting metals such as stainless steel, bronze, or the like, although the structure may also be made of plastic and other suitable materials as desired.

The shank 30 of the plug has at its upper end on the outside helical threads or teeth 34 which are surrounded by and at particular spaced circumferential points engaged by interior helical threads or teeth 35 on a deflectable nut or flexspline 36 which at its outside engages the inside of the cover 28. The nut has an elongated deflectable extension 37 surrounding the stem 30 of the plug and a flange 38 toward the plug with respect to the cover flange 31. A spring 40, suitably a Belleville, is interposed beneath the flange 38 and above the large end of the plug to urge the plug against the seat of the housing.

Surrounding the nut 36 and as best seen in FIGURE 2 suitably journalling on a groove 41 on the outside of the cover is a wave generator 42 which is of a contour as described in my U.S. Patents Nos. 2,943,508; 2,906,143; 2,931,249; 2,929,265; 2,929,266; 2,932,986; 2,943,513 and 2,959,065, to provide lobes which will deflect the threads or teeth on the nut 36 into contact with the threads or teeth 34 on the stem at a plurality of spaced points, with intermediate points around the circumference at which the threads or teeth are out of contact and out of mesh as shown in FIGURE 3.

The wave generator 42 is made more rigid and is turned by any suitable mechanism which may be mechanically driven but which, for the sake of simplification, is illustrated as a hand wheel 43.

Normally if a spring such as Belleville spring 40 were to urge the plug 26 into the seat 25, the plug would wring into place and get so tight that it would seize. Unlike the usual drive, however, the drive of the present invention provides a combination motion which is very effective in moving the plug. As the hand wheel or other mechanism turns the wave generator 42, the plug by the frictional drag on its outside is retarded against rotating but is free to withdraw. The relative motion, therefore, of the flexnut 36 tends to lift the plug off its seat. As soon as the plug 26 has been unseated and is free to rotate, the Belleville spring 40 provides a drag against further axial withdrawal of the plug which is greater than the frictional drag against rotation, and the drive of the invention tends to rotate the plug 26. Thus, in summary the rotation of the hand wheel 43 first loosens the plug and then rotates the plug. After the plug has been rotated to the desired position, and this can be indicated by an index on the hand wheel which aligns with an index on the cover, the hand wheel will be rotated in the opposite direction and this will tend to seat the plug 26 solidly by axial movement toward the seat 25 of the housing. The next time it is desired to release the plug the same cycle takes place.

It is thus possible to use the plug valve in such a manner that as the hand wheel is rotated in the operating direction, the valve will always go through the sequence of first loosening the plug 26 and then turning the plug 26 so that the hand wheel can be turned easily, and if the hand wheel is turned in the opposite direction, it will seat the plug 26 solidly at any point, open, partially open or closed as desired.

Thus, under one set of conditions the device of the invention acts as a linear actuator and under another set of conditions it acts as a gear reducer. It functions as a linear actuator when the driven element (for example the plug) is restrained against rotation, and it functions as a gear reducer when the driven element (the plug) is restrained against axial motion.

In harmonic drive linear actuators of the character shown in my U.S. Patent 2,943,508 above referred to, the helix angle of the nut and of the screw have been different, either one right hand and the other left hand or else both right hand or both left hand but different in lead. The difference in lead equals or is a multiple of the number of lobes on the wave generator or strain inducer, and where an elliptoidal wave generator has been used which has two lobes, the difference in lead has been 2.

In the device of the present invention the helix angles on the screw and on the nut are identical. Thus, as an example in a particular case both helix angles will be 45°, although various other helix angles may be used. A helix angle of 45° is desirable for many applications and is commonly used by way of illustration in this description.

Although the point may be difficult to visualize, there is still in the present invention a difference in lead which corresponds to the number of lobes on the wave generator (where an elliptoidal wave generator is used the difference in lead is 2 or a multiple thereof). This is accomplished because the nut 36 is of larger diameter than the screw 30 and therefore there will be extra teeth on the nut beyond the number of teeth on the screw which equal the number of lobes on the wave generator or a multiple thereof. In the specific case of the elliptoidal wave generator there will be 2 extra teeth on the nut or a multiple thereof.

An important difference between the harmonic drive of the present invention and that of the linear actuator in my patent above referred to, is that in the present invention, since the threads or teeth have the same helix angle, they are now in area contact through an appreciable length which was not true of the linear actuator in the patent. This is an important aspect from the standpoint of reduction in contact pressure, and reduction in wear.

Figure 4:
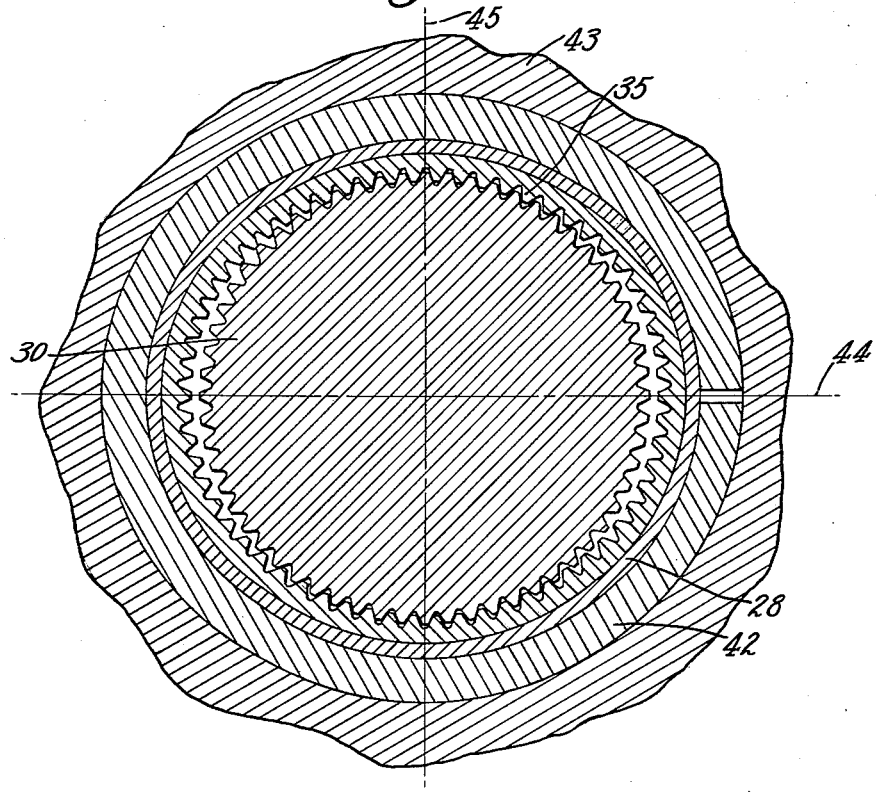
FIGURE 4 is a diagrammatic fragmentary cross sectional view which shows the various components of the drive illustrated in FIGURES 1 to 3, and particularly illustrates the relationship of the teeth.

By reference to FIGURE 2 the relationship of the teeth on the nut 36 and on the screw 30 at the minor axis of the elliptoid or other point of contact is shown. As illustrated, the teeth are fully engaged and in mesh when the wave propagated around the nut brings the minor axis into the section shown. FIGURE 3 illustrates the relationship of the teeth at the major axis of the elliptoid where they are out of contact and out of mesh. This is similar to the linear actuator of my patent, except that the condition exists in two transverse planes instead of only one plane. This aspect will be better understood by reference to the transverse section of FIGURE 4, where the condition at the major axis 44 is shown in FIGURE 5, and the condition at the minor axis 45 is shown in FIGURE 6. Here it will be seen that the threads or teeth are in intimate engagement on the minor axis and out of mesh and out of engagement on the major axis. When FIGURES 5 and 6 are compared with FIGURES 2 and 3 it is startling to realize that the conditions in FIGURES 3 and 5 and in FIGURES 2 and 6 are occurring almost identically in two different planes transverse to one another, so that whatever is true in one plane occurs in the other. The wave generator 42 in FIGURE 4 is shown as split to aid in assembling the elliptoid into the hand wheel, although of course the hand wheel can itself be split and fastened together, if desired.

In FIGURE 7 the teeth on the screw and the teeth on the nut have been rolled open so as to produce a development. The view shows the helix angle of the teeth and all the lines are intended to illustrate the center of a tooth. Since the plug or screw 30 is smaller in diameter than the nut 36, there are fewer teeth on the plug 30 than on the nut 36. Following rules previously laid down for rotary harmonic drive in a device having two lobes on the wave generator there are two in the smallest case (although it could be a multiple of two) less teeth on the plug or screw 30 than there are on the nut 36 since the difference in the number of teeth equals the number of lobes on the wave generator or a multiple thereof. As a simple illustration, FIGURE 7 shows 60 teeth 34 in the 360 degree circumference length for the developed surface of the plug or screw 30 and 62 teeth 35 in the 360 degree circumference length for the developed surface of the nut 36.

It will be observed that the developed length of the plug or screw is less than the developed length of the nut surface. As a consequence, if one were rolled into the other or made to mesh one with the other, at the end of the 360 degree rotation, the teeth on the nut would be two teeth ahead of the teeth on the plug, and this would indicate that there would be a rotational motion of the plug with respect to the nut if the wave generator were rotated. This rotational motion amounts to two teeth. This is clear when it is realized that the right hand end of the diagram in FIGURE 7 represents the beginning and end of 360 degrees just as does the left hand end of the diagram, hence, if the development of the nut were laid on top of the development of the plug or screw, and they were rolled together, then the end or 360 degrees on the right hand side of the plug would finish two teeth in from the 360 degree end on the right hand side of the nut. This means that the plug would have moved to the left the distance of two teeth. On the other hand if the plug or screw had been prevented from rotating, it would have moved axially the distance of two teeth to achieve the same result.

It will, perhaps, be easier to understand this from FIGURES 8, 9 and 10. In FIGURE 8 the circumferential length of the plug and of the nut have been laid down along the base line and the 45 degree helix angle has been drawn in. Since the 360 degree circumferential length of the plug is less than the 360 degree circumferential length of the nut, it can be seen that the helix line for the nut is longer than the helix line for the plug. If this difference in length is examined in an axial direction, the axial difference of the helices is equal to the axial pitch of two teeth. Hence, if the 360 degrees have to match up at the end of one revolution the plug will move two teeth in relation to the nut.

In FIGURE 9 the upper curve illustrates the radial separation of the helices. Fundamentally, it is the sine wave produced by the elliptoid of the wave generator. In this case the radial separation has been shown as the tooth height and the curve shows that for clearance purposes the separation is approximately 1½ tooth heights. In the lower part of FIGURE 9 a line shows the axial difference in the helices. This can be derived from FIGURE 8. In FIGURE 9 it is seen that for an axial pitch difference of two, the angle is 360 degrees. For an axial pitch difference of one the angle would be 180 degrees. It can now be seen that wherever the radial separation of the helices is zero, the value of the axial difference must be an integer such as zero, one, two, three, four. The only place where the axial difference is permitted to be other than an integer is at those places where there is radial separation of the helices.

FIGURE 10 plots in the upper curve the same information with the sine wave advanced 90 degrees. This has caused motion of one helix in relation to the other helix, since the crossover point in the curve must be at the place where there is no radial separation of the helices. This corresponds to 90 degrees in FIGURE 10. Hence as the wave progresses, the plug 30 must move axially in relation to the nut 36. This motion is strictly due to the difference in length of the helices of one in relation to the other and is not due to difference in helix angle. From this it is apparent that one revolution of the elliptoidal shape will axially advance the plug a distance of two teeth, assuming there is no rotational motion.

FIGURE 11 shows a variation of the form of the device of the invention in which an internal wave generator 42' consists of a drive shaft 46 journalled on a bearing 47 carrying an elliptoidal cam 48 having an elliptoidal race on its outside circumference which receives antifriction bearing round elements, suitably balls 50, which engage the interior of race 51 deflected into an elliptoidal and resting against the interior of screw 34' having helical teeth meshing at the diametrically opposite points on helical teeth of the same helix angle in nut 36' which in this case forms part of an outer casing.

The screw 34' is part of an elongated tube 52 which is flanged at 53 and connected to a casing portion 54. The elements 53 and 54 retain the bearing 47.

FIGURE 12 illustrates the form of the teeth 56 in a preferred embodiment. It is not mandatory to use this specific tooth form but it serves as a basis for discussion.

For normal purposes with a two lobe wave generator it is preferable to use a 60 degree included angle as shown and threadlike tooth form, for both the axial section and the cross section. Thus, the tooth has the form shown whether it is looked on as a thread or whether it is looked on as a spline or gear. The tooth suitably has a flat top 57 and a root fillet 58 as illustrated. Since the teeth have a 45 degree helix angle, if a cross section of the tooth is taken at the helix angle or normal to the tooth, the included angle between the teeth changes as shown in FIGURE 13 and the pitch of the teeth as viewed in FIGURE 13 is closer together. For example, for a 45 degree helix angle the pitch would be 0.707×the pitch of the longitudinal cross sectional view of FIGURE 12, and the angle between the teeth is 44 degrees, 25 minutes instead of the 60 degrees shown in FIGURE 12. This feature is reminiscent of helical gears.

Throughout this description the fact there is some oscillatory angular motion of peripheral points as the shape is rotated has been ignored. This is discussed in my U.S. Patent 2,959,065 for the rotary aspect, and in my U.S. Patent 2,943,508 for the linear aspect.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In a helical harmonic drive, an inner element having external helical teeth, an outer element around the inner element having internal helical teeth of the same helix angle as the teeth on the inner element, one of the inner and outer elements being deflectable, the inner and outer elements having their teeth in contact at a plurality of circumferentially spaced points with intermediate points in which the teeth are out of mesh and out of contact, the teeth on the outer element being more numerous than the teeth on the inner element by a difference which is equal to or a multiple of the number of points around the circumference at which the teeth are in contact, means for deflecting said deflectable element in contact with the other element at said spaced points and for propagating a wave of deflection around said deflectable element, and means for restraining motion of one of said elements in an axial direction while permitting motion of said element in a rotational direction.

2. In a helical harmonic drive, an inner element having external helical teeth, an outer element around the inner element having internal helical teeth of the same helix angle as the teeth on the inner element, one of the inner and outer elements being deflectable, the inner and outer elements having their teeth in contact at a plurality of circumferentially spaced points with intermediate points in which the teeth are out of mesh and out of contact, the teeth on the outer element being more numerous than the teeth on the inner element by a difference which is equal to or a multiple of the number of points around the circumference at which the teeth are in contact, means for deflecting said deflectable element in contact with the other element at said spaced points and for propagating a wave of deflection around said deflectable element, and means for restraining motion of one of said elements in a rotational direction while permitting motion of said element in an axial direction.

3. In a helical harmonic drive, an inner element having external helical teeth, an outer element around the inner element having internal helical teeth of the same helix angle as the teeth on the inner element, one of the outer and inner elements being deflectable, the inner and outer elements having their teeth in contact at a plurality of circumferentially spaced points with intermediate points in which the teeth are out of mesh and out of contact, the teeth on the outer element being more numerous than the teeth on the inner element by a difference which is equal to or a multiple of the number of points around the circumference at which the teeth are in contact, means for deflecting said deflectable element into contact with the other element at said spaced points and for propagating a wave of deflection around said deflectable element, and spring means for retarding motion of one of said elements in one of the directions in which it is free to move either rotationally or axially while permitting motion of said element in said other direction.

4. In a plug valve, an inner element having external helical teeth, an outer element surrounding the inner element, having internal helical teeth of the same helix angle as the inner element, one of the outer and inner elements being deflectable, the inner and outer elements having their teeth in contact at a plurality of circumferentially spaced points with intermediate points in which the teeth are out of mesh and out of contact, the teeth on the outer element being more numerous than the teeth on the inner element by a difference which is equal to or a multiple of the number of points around the circumference at which the teeth are in contact, means for deflecting said deflectable element into contact with the other element at said spaced points and for propagating a wave of deflection around the deflectable element, a housing provided with a plug recess having valve passages at opposite ends, one of said elements being interconnected to said housing, and a plug in the housing interconnected to the other element and manipulated in respect to both axial and circumferential motion by said other element, whereby the engagement of the plug in the plug recess retards the plug against rotation and permits the plug to move axially before it rotates.

5. A plug valve of claim 4, in combination with spring means acting axially between the plug and the housing and imposing drag on said plug, whereby when the plug is initially seated the first action of the drive is to unseat it and then to rotate it and then to again seat it as the frictional engagement between the plug and the housing is at times greater and at other times less than the spring drag.

6. A plug valve of claim 4, in combination with an elastic closure interposed between said means for deflecting and the one of said elements next to said means for deflecting and interconnected with the housing.

References Cited in the file of this patent

UNITED STATES PATENTS

| | | |
|---|---|---|
| 582,252 | Ashley | May 11, 1897 |
| 1,138,531 | Birkbeck | May 4, 1915 |
| 2,114,933 | Nielson | Apr. 19, 1938 |
| 2,212,572 | McCarthy et al. | Aug. 27, 1940 |
| 2,488,283 | Franck | Nov. 15, 1949 |
| 2,578,630 | Hartman | Dec. 11, 1951 |
| 2,931,380 | Mueller | Apr. 5, 1960 |
| 2,943,508 | Musser | July 5, 1960 |
| 2,975,649 | Propst | Mar. 21, 1961 |
| 2,979,964 | Musser | Apr. 18, 1961 |